(12) United States Patent
Sunke et al.

(10) Patent No.: US 12,269,447 B2
(45) Date of Patent: Apr. 8, 2025

(54) PARKING BRAKE ACTUATOR

(71) Applicant: HL MANDO CORPORATION, Pyeongtaek-si (KR)

(72) Inventors: Prakash D Sunke, Haryana (IN); Sudhirkumar S Karajgi, Haryana (IN)

(73) Assignee: HL MANDO CORPORATION, Pyeongtaek si (KR)

( * ) Notice: Subject to any disclaimer, the term of this patent is extended or adjusted under 35 U.S.C. 154(b) by 305 days.

(21) Appl. No.: 17/774,577

(22) PCT Filed: Oct. 12, 2020

(86) PCT No.: PCT/KR2020/013861
§ 371 (c)(1),
(2) Date: May 5, 2022

(87) PCT Pub. No.: WO2021/091101
PCT Pub. Date: May 14, 2021

(65) Prior Publication Data
US 2022/0396252 A1 Dec. 15, 2022

(30) Foreign Application Priority Data
Nov. 6, 2019 (KR) ........................ 10-2019-0140798

(51) Int. Cl.
*B60T 13/74* (2006.01)
*F16D 65/14* (2006.01)
(Continued)

(52) U.S. Cl.
CPC ............ *B60T 13/746* (2013.01); *F16D 65/14* (2013.01); *F16H 57/031* (2013.01);
(Continued)

(58) Field of Classification Search
CPC ...... B60T 13/746; B60T 13/741; B60T 1/005; B60T 2270/40; F16H 57/031;
(Continued)

(56) References Cited

U.S. PATENT DOCUMENTS 10,047,812 B2 *  8/2018  Watzek ................... F16D 65/18
2007/0187193 A1  8/2007  Tarhan et al.
(Continued)

FOREIGN PATENT DOCUMENTS

EP      1058795       9/2003
JP      H19-77396 A   3/1997
(Continued)

OTHER PUBLICATIONS

Korean Patent No. KR 101701291 to Kim et al published on Feb. 2, 2017.*

(Continued)

*Primary Examiner* — Pamela Rodriguez
(74) *Attorney, Agent, or Firm* — LEE, HONG, DEGERMAN, KANG & WAIMEY

(57) ABSTRACT

Disclosed is an actuator for a parking brake. In accordance with an aspect of the disclosure an actuator for a parking brake includes a motor generating power; a reduction gear portion including a driving gear rotating in association with a drive shaft of the motor, and a sun gear coupled to the drive gear to rotate together; a housing in which the motor and the reduction gear portion are accommodated; and a locking portion configured to limit rotation of the reduction gear portion; wherein the locking portion is further configured to a pair of locking members configured to restrain and release at least a part of a rotation shaft of the sun gear, a plurality of elastic members supporting each of the locking members in a direction of the rotation shaft of the sun gear, an electromagnet member configured to separate the pair of
(Continued)

locking members from the sun gear by generating an electromagnetic force when the power is applied.

13 Claims, 6 Drawing Sheets

(51) Int. Cl.
*F16D 121/22* (2012.01)
*F16D 121/24* (2012.01)
*F16D 125/50* (2012.01)
*F16D 127/06* (2012.01)
*F16H 57/02* (2012.01)
*F16H 57/031* (2012.01)

(52) U.S. Cl.
CPC ....... *B60T 2270/40* (2013.01); *F16D 2121/22* (2013.01); *F16D 2121/24* (2013.01); *F16D 2125/50* (2013.01); *F16D 2127/06* (2013.01); *F16H 2057/02034* (2013.01); *F16H 2057/02082* (2013.01)

(58) Field of Classification Search
CPC .......... F16H 35/00; F16H 57/10; F16H 57/02; F16H 2035/005; F16H 2057/02082; F16H 1/28; F16H 2057/02034; F16D 65/14; F16D 2121/24; F16D 2124/22; F16D 2127/06; F16D 2125/50
See application file for complete search history.

(56) References Cited

U.S. PATENT DOCUMENTS

| | | | | |
|---|---|---|---|---|
| 2013/0270047 A1* | 10/2013 | Kim | ........................ | F16D 65/18 188/72.1 |
| 2020/0031321 A1* | 1/2020 | Joon-Kyu | ................. | F16H 1/30 |
| 2021/0071727 A1* | 3/2021 | Jang | ........................ | B60T 13/741 |
| 2022/0379866 A1* | 12/2022 | Sim | ........................... | F16H 1/28 |
| 2022/0388489 A1* | 12/2022 | Karajgi | ................... | F16D 65/16 |
| 2022/0396253 A1* | 12/2022 | Karajgi | ................. | B60T 13/741 |

FOREIGN PATENT DOCUMENTS

| | | |
|---|---|---|
| JP | 2002-211382 A | 7/2002 |
| JP | 2016-142411 A | 8/2016 |
| KR | 10-2015-0117116 A | 10/2015 |

OTHER PUBLICATIONS

WO document No. 2021153939 to Lim et al published on Aug. 5, 2021.*
Chinese Patent No. CN 114341521 to Song published on Apr. 12, 2022.*
Translation of Japanese Patent No. JPH0977396 published on Mar. 25, 1997 (translation obtained from Search database).*
International Search Report (PCT/ISA/210) issued in PCT Application No. PCT/KR2020/013861 dated Jan. 29, 2021 with English Translation.
Written Opinion (PCT/ISA/237) issued in PCT Application No. PCT/KR2020/013861 dated Jan. 29, 2021.
Deutsches Patent- und Markenamt Application No. 112020005434.9, Office Action dated Nov. 5, 2024, 6 pages.

* cited by examiner

[FIG. 1]
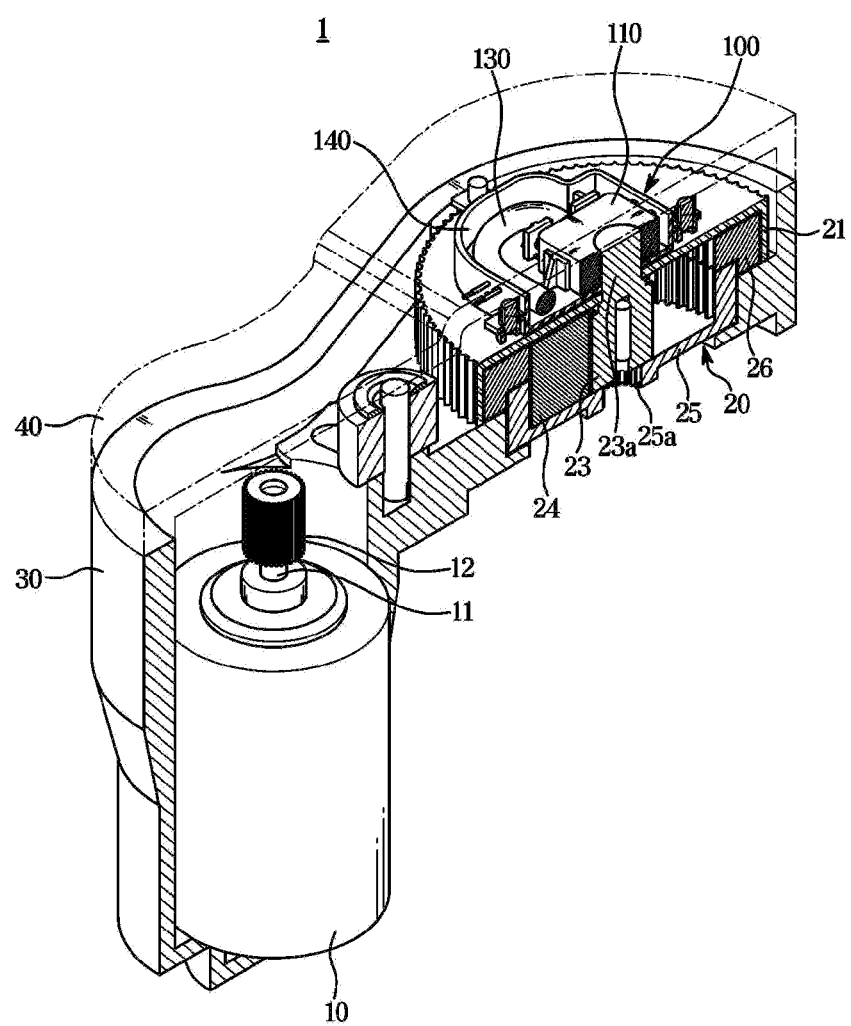

[FIG. 2]
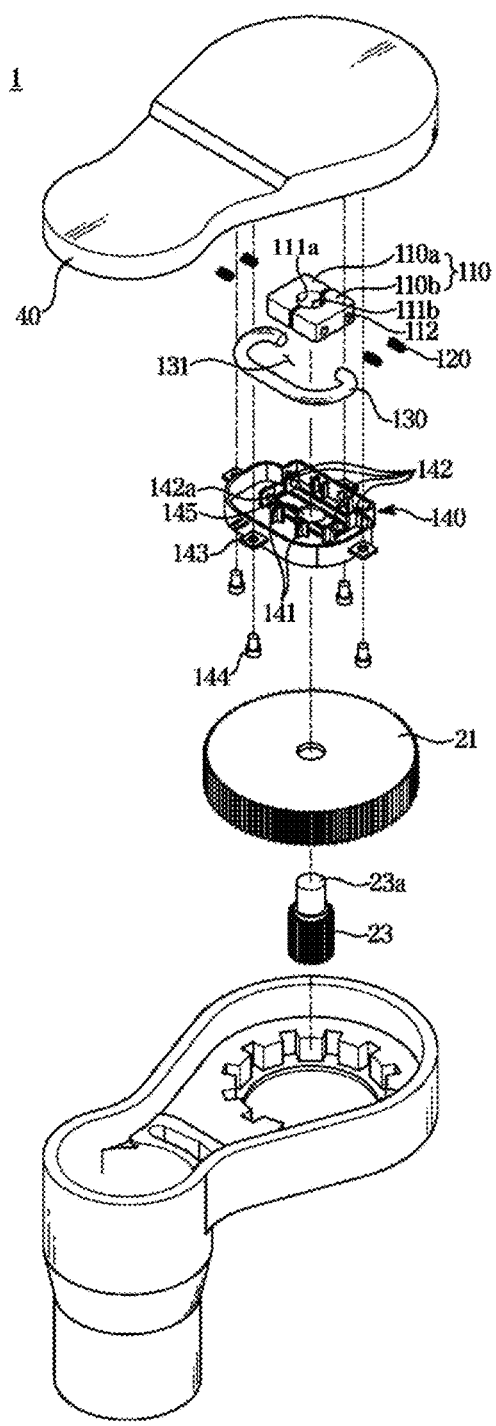

【FIG. 3】
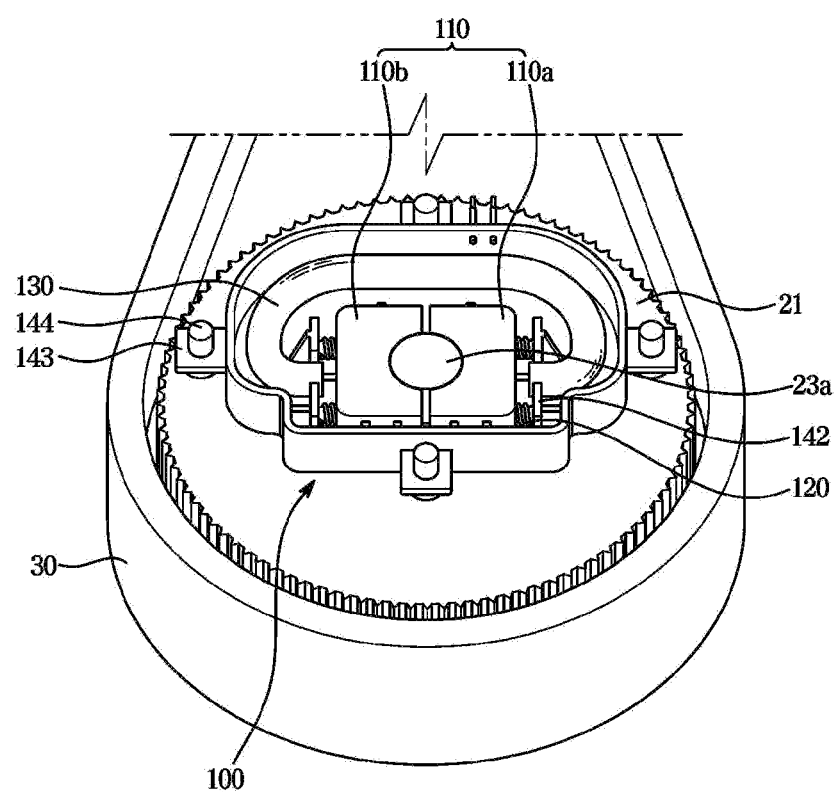

[FIG. 4]
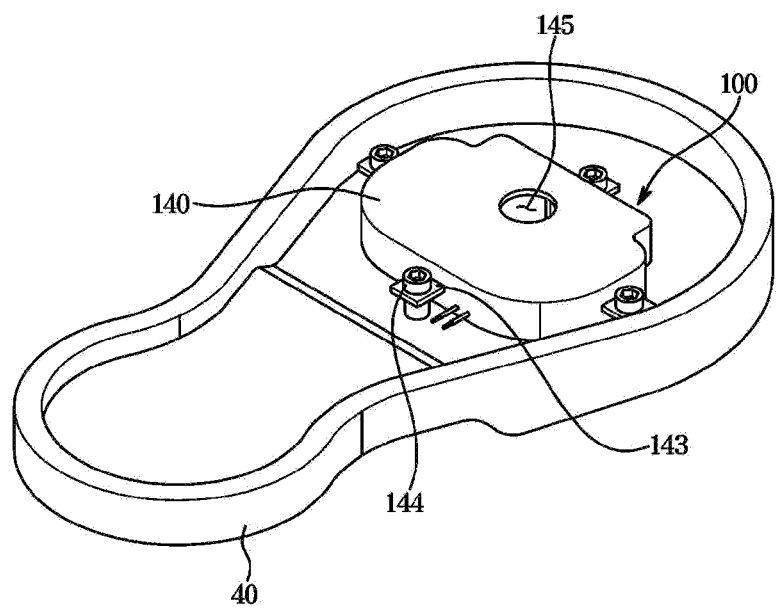

[FIG. 5]
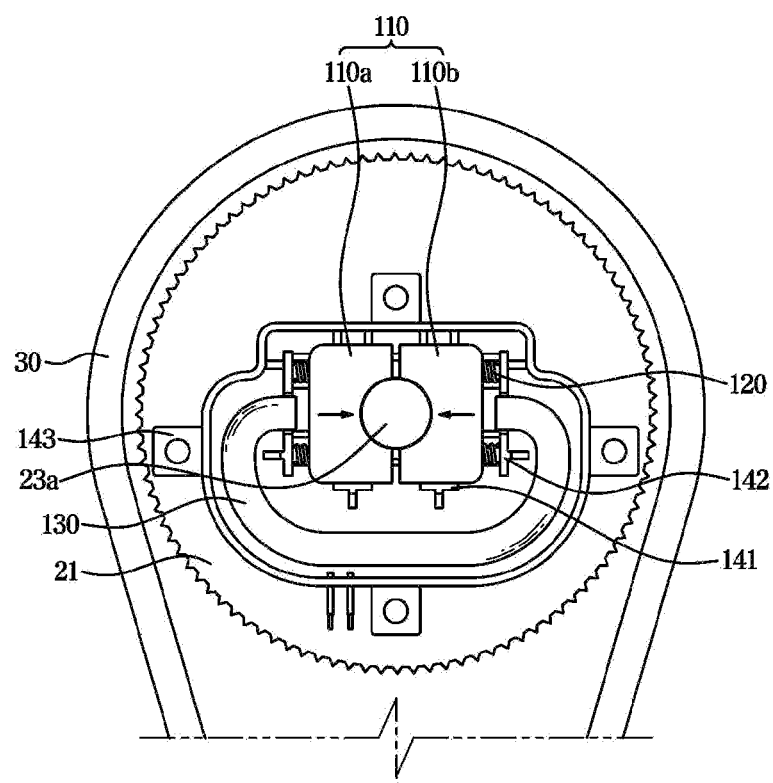

[FIG. 6]
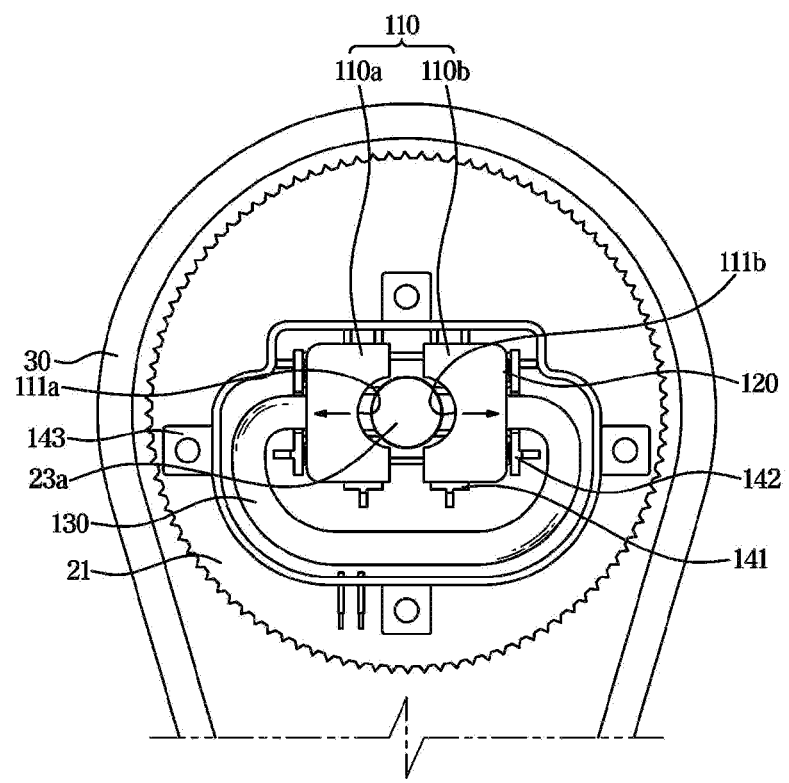

PARKING BRAKE ACTUATOR

CROSS-REFERENCE OF RELATED APPLICATIONS

This application is the U.S. National Phase under 35 U.S.C. § 371 of International Patent Application No. PCT/KR2020/013861, filed on Oct. 12, 2020, which claims the benefit of Korean Patent Application No. 10-2019-0140798, filed on Nov. 6, 2019, the entire disclosures of each are incorporated by reference herein.

TECHNICAL FIELD

The disclosure relates to an actuator for a parking brake, and more particularly, to an actuator for a parking brake capable of stably maintaining a parking braking state when the parking brake is operated.

BACKGROUND ART

Generally, a vehicle is equipped with a brake system for performing braking essentially. Such a brake system requires a service brake function that provides braking force in a driving situation of the vehicle, and a parking brake function that maintains the vehicle in a stopped state when parking.

In a conventional parking brake, a foot brake driven by pedaling with a foot and a hand brake by pulling a lever by a hand are mainly used. For the hand brake, a user pulls the lever up with one hand with a lot of force to operate a lever of the parking brake, so that drivers who stop and park frequently a vehicle may injure their backs and put strain on their arms. Furthermore, a lever of the parking brake is located in a center of a console, which limits utilization of an indoor space of a vehicle.

Therefore, nowadays, a method of implementing electro-mechanical parking braking by using an actuator that generates braking force by a motor by receiving the driver's intention for parking braking as an electrical signal, such as pressing a button is being developed.

During a parking brake of a vehicle, a parking portion, such as a piston and a nut-spindle of a caliper brake and a parking brake shoe of a drum brake, maintains braking force. However, even if the parking portion maintains parking braking power, if there is a variant that prevents maintenance of parking braking, such as receiving an external shock or having to park a vehicle on a slope, the parking braking state of the vehicle may be released and then the vehicle may move. Accordingly, to prevent the vehicle from moving in spite of the parking braking state, stones or struts are often placed between wheels or at a rear of the wheels.

To maintain the parking braking state when a parking brake function of the vehicle is operated as described above, various locking methods have been developed such as a separate locking gear that is provided in a gear portion of the actuator so as to maintain the fixed state of the actuator.

DISCLOSURE

Technical Problem

An aspect of the disclosure is to provide an actuator for a parking brake capable of suppressing a roll back of a vehicle during a parking braking.

Another aspect of the disclosure is to provide an actuator for a parking brake capable of improving responsiveness and stability during the parking braking.

Another aspect of the disclosure is to provide an actuator for a parking brake capable of improving vehicle mountability of a product and improving a design freedom of the vehicle.

Another aspect of the disclosure is to provide an actuator for a parking brake that maintains a locked state when power is not applied to reduce vehicle current consumption and has a fail-safe function.

Technical Solution

In accordance with an aspect of the present disclosure, an actuator for a parking brake includes a motor generating power; a reduction gear portion including a driving gear rotating in association with a drive shaft of the motor, and a sun gear coupled to the drive gear to rotate together; a housing in which the motor and the reduction gear portion are accommodated; and a locking portion configured to limit rotation of the reduction gear portion; wherein the locking portion is further configured to a pair of locking members configured to restrain and release at least a part of a rotation shaft of the sun gear, a plurality of elastic members supporting each of the locking members in a direction of the rotation shaft of the sun gear, and an electromagnet member configured to separate the pair of locking members from the sun gear by generating an electromagnetic force when the power is applied.

The pair of locking members may be arranged to face the sun gear as a center thereof and is provided to be in close contact with the rotation shaft of the sun gear.

Each the pair of locking members may include a friction surface having a shape corresponding to an outer circumferential surface of the rotation shaft of the sun gear, the friction surface being a surface facing the rotation shaft of the sun gear.

The actuator may further include a housing cover for closing the housing, wherein the locking portion further includes an assembly housing accommodating the pair of locking members, the elastic members, and the electromagnet member thereinside and mounted on the housing cover.

The assembly housing may include a side rib configured to support slidably the pair of locking members; and a support rib configured to limit a movement range of the pair of locking members.

The elastic member may be interposed between the support rib and the locking member.

The elastic member may have one end supported by the support rib and the other end thereof inserted into an insertion hole provided on an outer surface of the locking member.

The elastic member may be provided as a coil spring.

The assembly housing may be mounted on an inner wall of the housing cover.

The assembly housing may include a hole into which at least a part of the rotation shaft of the sun gear is inserted.

The electromagnet member may be provided in a C-shape with an opening on one side thereof, and the pair of locking members is disposed in the opening.

The reduction gear portion further may include a plurality of planetary gears meshed with the sun gear; and an external gear meshed with the plurality of planetary gears and having a connection portion connected to the parking portion.

In accordance with another aspect of the present disclosure, an actuator for a parking brake includes a motor generating power; a reduction gear portion which rotates together with a drive shaft of the motor and adjusts a gear ratio; and a locking portion configured to limit rotation of the reduction gear portion; wherein the locking portion is further configured to at least one locking member provided to be slidably movable toward a central axis of the reduction gear portion, at least one elastic member elastically supporting the at least one locking member so as to be in close contact with the central axis of the reduction gear portion, and an electromagnet member configured to separate the locking member from the central axis of the reduction gear portion by generating an electromagnetic force when the power is applied.

The actuator may further include a housing in which the motor and the reduction gear portion are accommodated; and a housing cover for closing the housing, wherein the locking portion is mounted on the housing cover.

Advantageous Effects

An embodiment of disclosure may provide an actuator for a parking brake capable of suppressing a roll back of a vehicle during a parking braking.

Further, an embodiment of disclosure may provide an actuator for a parking brake capable of improving responsiveness and stability during the parking braking.

Further, an embodiment of disclosure may provide an actuator for a parking brake capable of improving vehicle mountability of a product and improving a design freedom of the vehicle.

Further, an embodiment of disclosure may provide an actuator for a parking brake that maintains a locked state when power is not applied to reduce vehicle current consumption and has a fail-safe function.

DESCRIPTION OF DRAWINGS

FIG. 1 is a cutaway perspective view schematically illustrating a cross section of an actuator for a parking brake according to an embodiment of the disclosure.

FIG. 2 is an exploded perspective view illustrating an actuator for a parking brake according to an embodiment of the disclosure.

FIG. 3 is a perspective view schematically illustrating an actuator for a parking brake according to an embodiment of the disclosure.

FIG. 4 is a perspective view illustrating a state in which a locking portion of an actuator for a parking brake is installed on a housing cover according to an embodiment of the disclosure.

FIG. 5 is a cross-sectional view illustrating an operation of an actuator for a parking brake in a locking mode according to an embodiment of the disclosure.

FIG. 6 is a cross-sectional view illustrating an operation of the actuator for parking brake when the locking mode is released according to an embodiment of the disclosure.

MODES OF THE INVENTION

Hereinafter, the embodiments of the disclosure will be described in detail with reference to accompanying drawings. It should be understood that the terms used in the specification and the appended claims should not be construed as limited to general and dictionary meanings, but interpreted based on the meanings and concepts corresponding to technical aspects of the disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

FIG. 1 is a cutaway perspective view illustrating a cross section of an actuator for a parking brake according to an embodiment of the disclosure, FIG. 2 is an exploded perspective view illustrating an actuator for a parking brake according to an embodiment of the disclosure, FIG. 3 is a schematically perspective view illustrating an actuator for a parking brake according to an embodiment of the disclosure, and FIG. 4 is a perspective view illustrating a state in which a locking portion of an actuator for a parking brake is installed on a housing cover according to an embodiment of the disclosure.

Referring to FIGS. 1 to 4, an actuator 1 for a parking brake according to an embodiment of the disclosure may include a motor 10 that generates power, a reduction gear portion 20 for transmitting the power of the motor 10 to a parking portion that implements a parking braking of a vehicle, a housing 30 in which the motor 10 and a gear are accommodated, a housing cover 40 for closing the housing 30, and a locking portion 100 for limiting rotation of the reduction gear portion 20.

The motor 10 may generate the power by receiving an electrical signal, and be accommodated in an internal space of the housing 30 coupled to a vehicle body (not shown) or a caliper (not shown).

Furthermore, a rotation gear 12 is coupled to an end of a drive shaft 11 of the motor 10 to be interlocked with a driving gear 21 of the reduction gear portion 20 to be described later. For example, the rotation gear 12 of the motor 10 transmits power through a belt (not shown) connecting the driving gear 21 or through at least one connecting gear (not shown) meshing with the driving gear 21.

The housing 30 may be provided to accommodate the motor 10, the reduction gear portion 20, and the locking portion 100, and the like. In particular, the housing 30 may accommodate and settles the motor 10 on one side thereof, and accommodate the reduction gear portion 20 on the other side thereof, and be coupled to the housing cover 40 to close thereinside.

The housing cover 40 may be provided to close the inside of the housing 30.

The housing cover 40 may be provided with the locking portion. More specifically, an assembly housing 140 may be fixed to an inner wall of the housing cover 40 by being coupled with a bolt 144, and a locking member 110 that includes a pair of locking members 110a and 110b (see, e.g., FIG. 2), an elastic member 120, and an electromagnet member 130 may be accommodated in the assembly housing 140.

The reduction gear portion 20 may transmit the power of the motor 10 to the parking portion (not shown), and may adjust a gear ratio to decrease a speed while amplifying the torque.

The reduction gear portion 20 may include the driving gear 21 interlocked with the rotation gear 12, a sun gear 23 that is accommodated at a lower end of the driving gear 21 and is coupled to the same rotation shaft 23a as the driving gear 21 to rotate together, a plurality of planetary gears 24 that are externally meshed with the sun gear 23, and an external gear 25 that are externally meshed with the plurality of planetary gears 24 to rotate and transmits power to the parking portion (not shown).

The rotation shaft of the reduction gear portion 20 may be provided parallel to the drive shaft 11 of the motor 10, and the driving gear 21 and the sun gear 23 may be coupled to the same rotation shaft 23a to be rotatable together.

The driving gear 21 may be provided with a hollow at a lower side thereof to accommodate the sun gear 23, the planetary gears 24, and the external gear 25. As a result, the driving gear 21 may receive power from the motor 10 to transmit the power to the parking portion (not shown) through the sun gear 23, the planetary gears 24, and a connection portion 25a of the external gear 25 in sequence.

The locking portion 100 may be disposed on an upper side of the driving gear 21 to limit rotation of the reduction gear portion 20. More specifically, the locking portion 100 is installed on an inner wall of the housing cover 40 arranged on the upper side of the driving gear 21, and may restrain and release the rotation shaft 23a of the sun gear 23, thereby limiting the rotation of the reduction gear portion 20.

The sun gear 23 is provided at the lower end of the driving gear 21, and the rotating shaft 23a passes through the driving gear 21 and protrudes upward. At this time, at least a part of the rotation shaft 23a of the sun gear 23 penetrates a hole 145 of the assembly housing 140 and is positioned inside the assembly housing 140. The rotation shaft 23a of the sun gear 23 may be restrained and released as a pair of locking members 110a and 110b are in close contact with and spaced apart, thereby restricting or allowing or the rotation of the reduction gear portion 20.

The sun gear 23 may be provided to be rotatable together with the driving gear 21 coupled to a stepped portion of the rotation shaft 23a, or may be provided integrally with the driving gear 21. Furthermore, the sun gear 23 may transmit power to the external gear 25 through at least one planetary gear 24 that is externally meshed with the sun gear 23. At this time, the planetary gears 24 may rotate in place.

The external gear 25 is externally meshed with the planetary gears 24 from one side thereof, and the connection portion 25a, that is connected to the parking portion, provided on the other side of the external gear 25 may transmit power from the planetary gears 24 to the parking portion (not shown).

The connection portion 25a may be provided in the form of a groove in which gear teeth are provided, and may be connected to the parking portion (not shown). For example, in a caliper brake system, the parking portion (not shown) may include a spindle-nut, a piston, and a pad plate, and the like, and the spindle is coupled to the connecting portion 25a to transmit power to press the pad plate against a disk. Because a specific operation of parking braking is a well-known technique, a detailed description thereof will be omitted. Furthermore, the actuator 1 for the parking brake of the disclosure is not limited to the caliper brake system, but is also applicable to the parking portion (not shown) of a drum brake system. Accordingly, it should be understood in the same manner that even if the connection portion 25a of the reduction gear portion 20 is connected to the parking portion (not shown) that implements parking braking of the drum brake system.

The locking portion 100 may be installed on the housing cover 40, and may be selectively provided to be in close contact with the reduction gear portion 20 to limit the rotation of the reduction gear portion 20. In other words, to prevent the parking portion (not shown) from being released in the parking braking state, the locking portion 100 is in close contact with the reduction gear portion 20 to prevent rotation of the reduction gear portion 20 by using frictional force.

The locking portion 100 may include the pair of locking members 110a and 110b that restrain and release at least a part of the rotational shaft 23a of the sun gear 23, a plurality of elastic members 120 supporting each locking member 110a and 110b in a direction of the rotation shaft 23a of the sun gear 23, and an electromagnet member 130 that separates the locking member 110a and 110b from the sun gear 23 by generating an electromagnetic force when power is applied. Furthermore, the locking portion further includes the assembly housing 140 accommodating the locking member 110a and 110b, the elastic member 120, and the electromagnet member 130 thereinside and mounted on the housing cover 40.

The locking member 110 is provided as a pair and disposed inside the assembly housing 140. At this time, the pair of locking members 110a and 110b are arranged to face the rotation shaft 23a of the sun gear 23 as a center thereof and are provided to be in close contact with the rotation shaft 23a.

In particular, the pair of locking members 110a and 110b has a corresponding friction surface 111a and 111b each having a shape corresponding to an outer circumferential surface of the rotation shaft 23a on a surface opposite to the rotation shaft 23a. In addition, the pair of locking members 110a and 110b may be in close contacted and spaced apart from the rotation shaft 23a by an elastic force of the elastic member 120 and an electromagnetic force of the electromagnet member 130, which will be described later. For example, the pair of locking members 110a and 110b are provided with the friction surfaces 111a and 111b each having a semicircular cross-section, and are in close contact with and spaced apart from the rotation shaft 23a having a cylindrical shape, thereby limiting the rotation of the reduction gear portion 20.

A side surface of the locking member 110 is supported by side ribs 141 to be provided slidably in a direction of the rotation shaft 23a of the sun gear 23. More specifically, the locking member 110 is provided to be slidably movable only in a direction, which is perpendicular to the rotation shaft 23a of the sun gear 23 and guided by the side ribs 141.

A support rib 142 may be provided in a moving (sliding) direction of the locking members 110 to limit a movement range of the locking member 110. At this time, the elastic member 120 is interposed between the locking member 110 and the support rib 142 so that the locking member 110 may be elastically supported in the direction of the rotational shaft 23a. Furthermore, an insertion hole 112 is provided on an outer surface of the support rib 142 side of the locking member 110 to accommodate an end of the elastic member 120, thereby preventing the elastic member 120 from shaking.

The locking member 110 may be formed of a material movable by electromagnetic force, for example, at least a part of the locking member 110 may be formed of metal. As a result, the locking member 110 may be spaced apart from the rotation shaft 23a by electromagnetic force when power is applied to the electromagnet member 130.

The plurality of elastic members 120 may be provided to elastically support each locking member 110 in the direction of the rotation shaft 23a of the sun gear 23. More specifically, the elastic member 120 is provided as a coil spring interposed between the support rib 142 and the locking member 110. One end of the elastic member is inserted into a protrusion 142a of the support rib 142, and the other end thereof is inserted into and fixed to the insertion hole 112 provided on the outer surface of the locking member 110.

Accordingly, the elastic member 120 prevents the rotation of the reduction gear portion 20 by forcing the locking member 110 to be in close contact with the rotation shaft 23*a* of the sun gear 23 in the locking mode (or when power is not applied to the electromagnet member 130).

The electromagnet member 130 may be provided as an object that generates a magnetic field when a current flows, and also may be provided to separate the locking member 110 from the sun gear 23 by using electromagnetic force. Although not shown in the drawings, the electromagnet member 130 may be receive a current by connecting a conductive wire.

The electromagnet member 130 may be provided in a C-shape so that the pair of locking members 110*a* and 110*b* are disposed in an opening 131 therebetween. The length of the opening 131 of the electromagnet member 130 is greater than that of the pair of locking members 110*a* and 110*b*, so that the pair of locking members 110*a* and 110*b* may receive sufficient electromagnetic force from the opening 131 of the electromagnet member 130. Furthermore, the opposite ends of the electromagnet member 130 may be fitted between the support ribs 142, respectively, thereby fixing without shaking.

However, the above-described electromagnet member 130 is merely an example, and can be changed in various ways and should be understood in the same way as long as it may be spaced apart from the rotation shaft 23*a* of the sun gear 23 by generating electromagnetic force in the pair of locking members 110*a* and 110*b* described above.

The assembly housing 140 has a space on an upper surface thereof to accommodate the locking member 110, the elastic member 120, and the electromagnet member 130, and is mounted on the inner wall of the housing cover 40 at the same time to close the space.

The assembly housing 140, on an inner bottom surface thereof, may include the side rib 141 supporting the pair of locking members 110*a* and 110*b* to be slidably movable, and the support rib 142 limiting the movement range of the pair of locking members 110*a* and 110*b*. In this case, the support rib 142 may be provided symmetrically about the rotation shaft 23*a* of the sun gear 23, and may support the end of the elastic member 120. In addition, the protrusion 142*a* is provided on the inner surface of the support rib 142 so that the elastic member 120 in the form of a coil spring is fitted to be fixedly provided.

In the assembly housing 140, the hole 145 may be formed so that at least a part of the rotation shaft 23*a* of the sun gear 23 may be inserted into the assembly housing 140. In other words, the hole 145 has a larger diameter than that of the rotation shaft 23*a* of the sun gear 23 so that the rotation shaft 23*a* of the sun gear 23 may pass through. As a result, the rotation shaft 23*a* of the sun gear 23 is provided to be rotatably in a state in which the rotation shaft 23*a* is inserted into the assembly housing 140, and is restrained or released as the locking member 110 is in close contact with or spaced apart from the rotation shaft 23*a* of the sun gear 23.

Furthermore, the assembly housing 140 is provided with a plurality of mounting portions 143 on the outer surface thereof to be coupled to the inner wall of the housing cover 40 with bolts 144. Accordingly, because the locking portion 100 is mounted on the housing cover 40 that eventually closes the housing 30, which affects only the assembly process of the housing cover 40, thereby improving assembly. In addition, because the locking portion 100 is mounted on the housing cover 40, during the design of the locking portion 100 is changed, it is easy to change the design because other parts are not accompanied by design change.

In an embodiment of the disclosure, an electronic control unit (ECU, not shown) for controlling the motor 10 and the electromagnet member 130 may be included. The ECU according to an exemplary embodiment of the disclosure may be implemented through a non-volatile memory (not shown) configured to store data related to an algorithm configured to control operation of various components or software instructions for reproducing the algorithm, and a processor (not shown) configured to perform operations described below using data stored in the corresponding memory. Alternatively, the memory and processor may be implemented as a single chip integrated with each other. A processor may have in the form of one or more processors.

Hereinafter, an operation of the actuator 1 for a parking brake according to an embodiment of the disclosure will be described.

FIG. 5 is a cross-sectional view illustrating an operation of the actuator 1 for the parking brake in the locking mode according to an embodiment of the disclosure, and FIG. 6 is a cross-sectional view illustrating an operation of the actuator for the parking brake when the locking mode is released according to an embodiment of the disclosure.

Referring to FIGS. 5 and 6, the actuator 1 for the parking brake according to an embodiment of the disclosure may operate in the locking mode for maintaining the parking braking state of the vehicle and in a locking release mode due to the release of the parking braking of the vehicle.

First, in the locking mode, the actuator 1 for the parking brake receives an electric signal from the ECU (not shown), generates power by the motor 10, and transmits the power to the parking portion (not shown) through the reduction gear portion 20, thereby implementing the parking braking. When the parking braking is completed, the locking portion 100 prevents the reduction gear portion 20 from rotating in the direction in which the braking is released in order to maintain the braking state.

More specifically, in actuator 1 for the parking brake when the braking is completed, the power applied to the electromagnet member 130 is released, and the electromagnetic force acting on the pair of locking members 110*a* and 110*b* extinguished. At this time, each of the pair of locking members 110*a* and 110*b* is elastically supported toward the rotation shaft 23*a* of the sun gear 23 by the elastic member 120 and thus is in close contact with the rotation shaft 23*a* of the sun gear 23 to prevent the sun gear 23 and the reduction gear portion 20 from rotating. In particular, when the locking member 110*a* and 110*b* and the rotation shaft 23*a* are in close contact with each other, the friction surfaces 111*a* and 111*b* respectively provided on the pair of locking members 110*a* and 110*b* are in close contact with the rotation shaft 23*a*, so that the rotation of the reduction gear portion 20 may be prevented by the frictional force.

Next, when the locking mode is released, the actuator 1 for the parking brake separates the locking member 110 from the rotation shaft 23*a* of the sun gear 23 to release the parking braking, thereby allowing the reduction gear portion 20 to rotate in the braking release direction. More specifically, the ECU applies power to the electromagnet member 130 to generate electromagnetic force, and thus the locking member 110 is spaced apart from the rotation shaft 23*a* of the sun gear 23 by the electromagnetic force. At this time, the magnitude of the electromagnetic force is greater than that of the elastic force of the elastic member 120 elastically supporting the locking member 110 in the direction of the rotation shaft 23*a*, so that the locking member 110 is spaced apart from the rotation shaft 23*a*. In particular, the electromagnetic forces generated from one end and the other end of the electromagnet member 130 respectively generate attractive forces to affect the pair of locking members 110a and 110b, so that the locking member 110 is moved to a direction spaced apart from the rotation shaft 23a. As a result, a gap is generated between the locking member 110 and the rotation shaft 23a of the sun gear 23, so that frictional force is not generated, thereby allowing the rotation of the reduction gear portion 20.

When the locking member 110 is spaced apart, the motor 10 receiving the electrical signal from the ECU (not shown) generates power in the direction to release the parking braking and transmits the power through the reduction gear portion 20, thereby implementing the braking release.

As described above, the actuator 1 for the parking brake according to an embodiment of the disclosure may prevent the braking from being released in the parking braking state. Furthermore, because the power is not applied to the locking portion 100 in the locking mode, it is possible to quickly and stably maintain the posture of the vehicle without additional current consumption in the parking state of the vehicle. Moreover, the actuator 1 for the parking brake of the disclosure may suppress a roll back phenomenon of the vehicle even during parking braking at an inclined place.

Furthermore, the actuator 1 for the parking brake according to an embodiment of the disclosure may be manufactured without significantly changing an assembly process of the product in a form in which only the locking portion 100 is added to the conventional actuator.

As described above, although a few embodiments of the disclosure have been shown and described, it would be appreciated by those skilled in the art that changes may be made in these embodiments without departing from the principles and spirit of the disclosure, the scope of which is defined in the claims and their equivalents.

The invention claimed is:

1. An actuator for a parking brake, comprising:
a motor generating power;
a reduction gear portion including a driving gear rotating in association with a drive shaft of the motor, and a sun gear coupled to the driving gear to rotate together;
a housing in which the motor and the reduction gear portion are accommodated; and
a locking portion configured to limit rotation of the reduction gear portion;
wherein the locking portion is further configured to:
a pair of locking members configured to restrain and release at least a part of a rotation shaft of the sun gear,
a plurality of elastic members supporting each of the locking members in a direction of the rotation shaft of the sun gear, and
an electromagnet member configured to separate the pair of locking members from the sun gear by generating an electromagnetic force when the power is applied,
wherein the electromagnet member is provided in a C-shape with an opening on one side thereof, and the pair of locking members is disposed in the opening, and
wherein the length of the opening of the electromagnet member is greater than that of the pair of locking members, so that the pair of locking members may receive sufficient electromagnetic force from the opening of the electromagnet member.

2. The actuator of claim 1, wherein the pair of locking members is arranged to face the sun gear as a center thereof and is provided to be in close contact with the rotation shaft of the sun gear.

3. The actuator of claim 2, wherein each of the pair of locking members comprises a friction surface having a shape corresponding to an outer circumferential surface of the rotation shaft of the sun gear, each friction surface being a surface facing the rotation shaft of the sun gear.

4. The actuator of claim 1, further comprising a housing cover for closing the housing,
wherein the locking portion further includes an assembly housing accommodating the pair of locking members, the elastic members, and the electromagnet member thereinside and mounted on the housing cover.

5. The actuator of claim 4, wherein the assembly housing comprises a side rib configured to support slidably the pair of locking members; and a support rib configured to limit a movement range of the pair of locking members.

6. The actuator of claim 5, wherein each elastic member is interposed between the support rib and each locking member.

7. The actuator of claim 6, wherein the elastic member has one end supported by the support rib and the other end thereof inserted into an insertion hole provided on an outer surface of the locking member.

8. The actuator of claim 7, wherein each elastic member is provided as a coil spring.

9. The actuator of claim 6, wherein the assembly housing is mounted on an inner wall of the housing cover.

10. The actuator of claim 6, wherein the assembly housing comprises a hole into which at least a part of the rotation shaft of the sun gear is inserted.

11. The actuator of claim 1, wherein the reduction gear portion further comprises:
a plurality of planetary gears meshed with the sun gear; and an external gear meshed with the plurality of planetary gears and having a connection portion connected to the parking portion.

12. An actuator for a parking brake, comprising:
a motor generating power;
a reduction gear portion which rotates together with a drive shaft of the motor and adjusts a gear ratio; and
a locking portion configured to limit rotation of the reduction gear portion;
wherein the locking portion is further configured to:
at least one locking member provided to be slidably movable toward a central axis of the reduction gear portion,
at least one elastic member elastically supporting the at least one locking member so as to be in close contact with the central axis of the reduction gear portion, and
an electromagnet member configured to separate the locking member from the central axis of the reduction gear portion by generating an electromagnetic force when the power is applied,
wherein the electromagnet member is provided in a C-shape with an opening on one side thereof, and the pair of locking members is disposed in the opening,
wherein the length of the opening of the electromagnet member is greater than that of the locking member, so that the locking member may receive sufficient electromagnetic force from the opening of the electromagnet member.

13. The actuator of claim 12, further comprising a housing in which the motor and the reduction gear portion are accommodated; and a housing cover for closing the housing,
wherein the locking portion is mounted on the housing cover.

* * * * *